United States Patent
Huttunen

(10) Patent No.: US 6,810,026 B1
(45) Date of Patent: Oct. 26, 2004

(54) METHOD OF REDUCING RADIO CHANNEL ACCESS DELAY IN GPRS SYSTEM, AND PACKET RADIO SYSTEM

(75) Inventor: Kari Huttunen, Oulu (FI)

(73) Assignee: Nokia Corporation, Espoo (FI)

( * ) Notice: Subject to any disclaimer, the term of this patent is extended or adjusted under 35 U.S.C. 154(b) by 0 days.

(21) Appl. No.: 09/559,840

(22) Filed: Apr. 26, 2000

Related U.S. Application Data

(63) Continuation of application No. PCT/FI99/00708, filed on Aug. 31, 1999.

(30) Foreign Application Priority Data

Sep. 2, 1998 (FI) .................................................. 981877

(51) Int. Cl.⁷ ................................................ H04B 7/00
(52) U.S. Cl. ........................ 370/310; 370/431; 370/464
(58) Field of Search ................................ 370/310, 328, 370/329, 343, 345, 431, 442, 443, 465, 464

(56) References Cited

U.S. PATENT DOCUMENTS

| | | | |
|---|---|---|---|
| 5,742,592 A | * | 4/1998 | Scholefield et al. ........ 370/329 |
| 5,752,193 A | | 5/1998 | Scholefield et al. |
| 5,809,419 A | * | 9/1998 | Schellinger et al. ........ 455/434 |

FOREIGN PATENT DOCUMENTS

| | | |
|---|---|---|
| WO | 9516330 | 6/1995 |
| WO | 9711566 | 3/1997 |
| WO | 9712477 | 4/1997 |
| WO | 9837706 | 8/1998 |

OTHER PUBLICATIONS

"GSM 03.64", European Telecommunications Standards Institute, France, TS 101 350 version 6.0.1, 1998.

* cited by examiner

*Primary Examiner*—Hassan Kizou
*Assistant Examiner*—Joe Logsdon
(74) *Attorney, Agent, or Firm*—Squire, Sanders & Dempsey LLP

(57) ABSTRACT

A method according to the invention of reducing radio channel access delay in a packet radio system, and a packet radio system, which comprises a network element 100, 102 132, 140 and at least one subscriber terminal 150, which network element 100, 102, 132, 140 transmits channel allocation messages A1, A2, . . . to the subscriber terminals 150, which channel allocation messages A1, A2, . . . are transmitted by means of paging subchannels G0 . . . G9 . . . , and which subscriber terminals 150 listen to one or several paging subchannels G0 . . . G9 . . . . The invention is characterized in that the channel allocation messages A1, A2, . . . to be transmitted to the subscriber terminals 150 are organized such that the cumulative total delay of all the channel allocation messages A1, A2, . . . is minimized by optimizing the use of the paging subchannels G0 . . . G9 . . . .

8 Claims, 3 Drawing Sheets

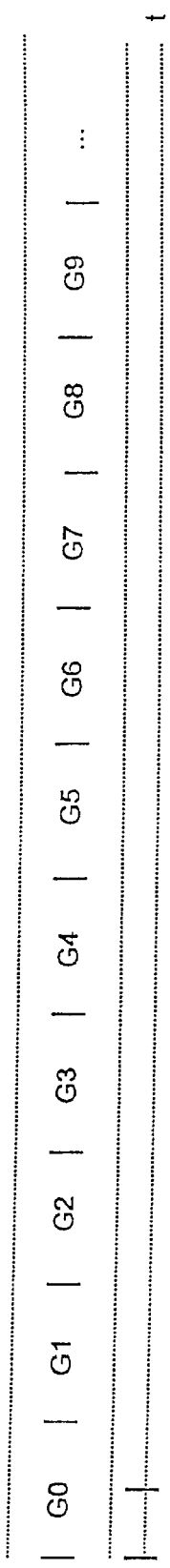
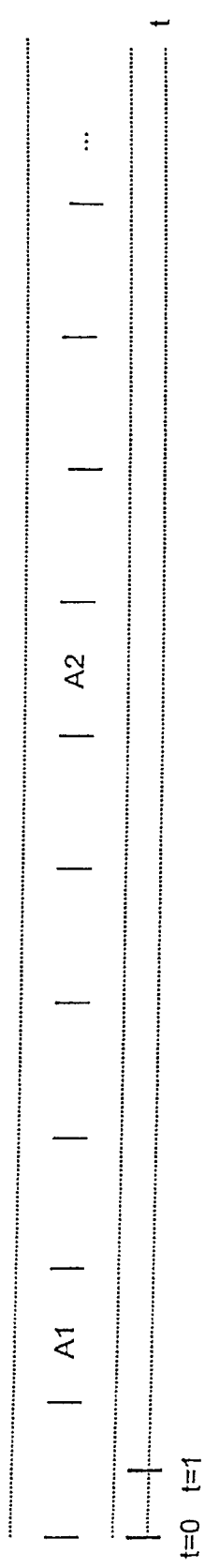
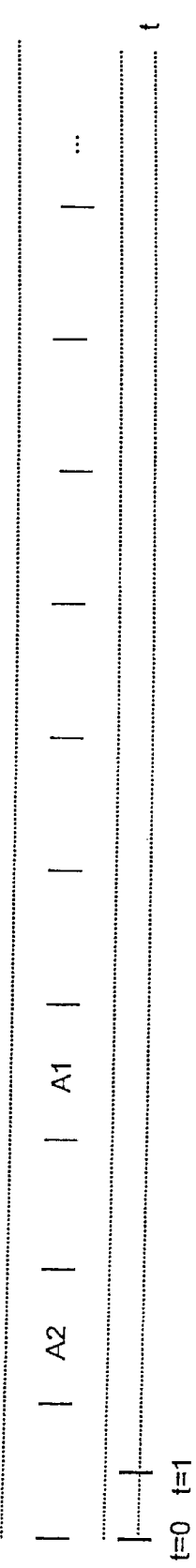
Fig 2A
Fig 2B
Fig 2C

METHOD OF REDUCING RADIO CHANNEL ACCESS DELAY IN GPRS SYSTEM, AND PACKET RADIO SYSTEM

This application is a continuation of international application serial number PCT/FI99/00708, filed Aug. 31, 1999.

FIELD OF THE INVENTION

The invention relates to a method and to a packet radio system implementing the method with which a mobile phone network according to the GPRS system is able to optimize radio channel access delay.

BACKGROUND OF THE INVENTION

A packet radio system refers to a radio system employing the packet switching technology that is known from fixed networks. Packet switching is a method where a connection is set up between users by transmitting data in packets which contain address and control information. Several connections can utilize simultaneously the same transmission link. The use of packet switched radio systems has been under special research since the packet switching method is very well suited to data transmission where the data to be transmitted is generated in bursts. There is thus no need to reserve a transmission link for the entire duration of transmission but only for the time when packets are transmitted. This saves costs and capacity considerably during both the set-up and use of the network.

Packet switched radio networks are presently of particular interest in the further development of the GSM system, in which case they are referred. to as General Packet Radio Service (GPRS). For example GSM specification 03.64 of the ETSI describes a radio interface between a network element and a subscriber terminal in the GPRS.

Unlike in a conventional GSM system, in the GPRS system a subscriber terminal is able to listen to more than one paging subchannel in a manner defined in the GPRS standard, and different subscriber terminals can determine themselves how often they want to listen to paging subchannels.

Therefore the mobile network is able to optimize the use of the paging subchannels such that the average radio channel access delay to a subscriber terminal is reduced.

However, a problem of the prior art arrangements is, for example, that radio resources are out of use. This problem only arises if the logic unit which makes a decision concerning the allocation of radio resources in the GPRS, i.e. a packet control unit PCU, does not also attend to the timing of the control channel, which can be either a packet common control channel PCCCH or a common control channel CCCH. Problems occur, for example, if the radio resources are allocated in the base station controller but the timing of the control channel takes place at the base station.

Another problem with the prior art arrangement is the increase in the power consumption. The GPRS determines a so-called extended paging procedure whereby it is possible to reduce the average channel access delay. A drawback of this method is that it increases the power consumption of the subscriber terminals within the cell area since the terminals must listen to the paging subchannels more often.

BRIEF DESCRIPTION OF THE INVENTION

An objective of the present invention is to develop a method of reducing radio channel access delay in a packet radio system, and a packet radio system, such that the aforementioned problems can be solved. This is achieved with a method described below, The invention relates to a method of reducing radio channel access delay in a packet radio system, which system comprises a network element and at least one subscriber terminal, which network element transmits channel allocation messages to the subscriber terminals, which channel allocation messages are transmitted by means of paging subchannels, and which subscriber terminals listen to one or several paging subchannels. In the method the channel allocation messages to be transmitted to the subscriber terminals are organized such that the cumulative total delay of all the channel allocation messages is minimized by optimizing the use of the paging subchannels.

The invention also relates to a packet radio system comprising a network element and at least one subscriber terminal, wherein the network element is arranged to transmit channel allocation messages to the subscriber terminals by means of a number of paging subchannels, and which subscriber terminals are arranged to listen to one or several paging subchannels. The packet radio system is arranged to organize the channel allocation messages to be transmitted to the subscriber terminals such that the cumulative total delay of all the channel allocation messages is minimized by optimizing the use of the paging subchannels. The preferred embodiments of the invention are disclosed in the dependent claims.

In the invention, channel allocation messages transmitted in a GPRS mobile network in accordance with discontinuous reception (DRX) are preferably organized such that they can be transmitted over the radio path as rapidly as possible.

The method and the system according to the invention provide several advantages. The method according to the invention reduces the channel access delay of a subscriber terminal and shortens the time when the radio resources are unnecessarily allocated. However, the method according to the invention does not increase the power consumption of the subscriber terminals within the cell area. Messages intended for subscribers using the DRX parameters are timed such that the cumulative total delay of all the messages is minimized. Therefore, due to the method according to the invention the use of the paging subchannels can be made considerably more effective, which results in a shorter average channel access delay for the subscriber terminals. The subscriber terminals are thus served more rapidly and the degree of use of the radio resources in the GPRS mobile network is improved.

BRIEF DESCRIPTION OF THE FIGURES

In the following, the invention will be described in greater detail in connection with the preferred embodiments with reference to the accompanying drawings, in which FIG. 2a shows a simplified example of a GPRS paging subchannel structure in a system according to the invention, FIG. 2b shows a conventional prior art DRX scheduling method, FIG. 2c shows channel allocation messages according to the invention to be transmitted according to the DRX method and arranged advantageously.

DETAILED DESCRIPTION OF THE INVENTION

Figure 1:
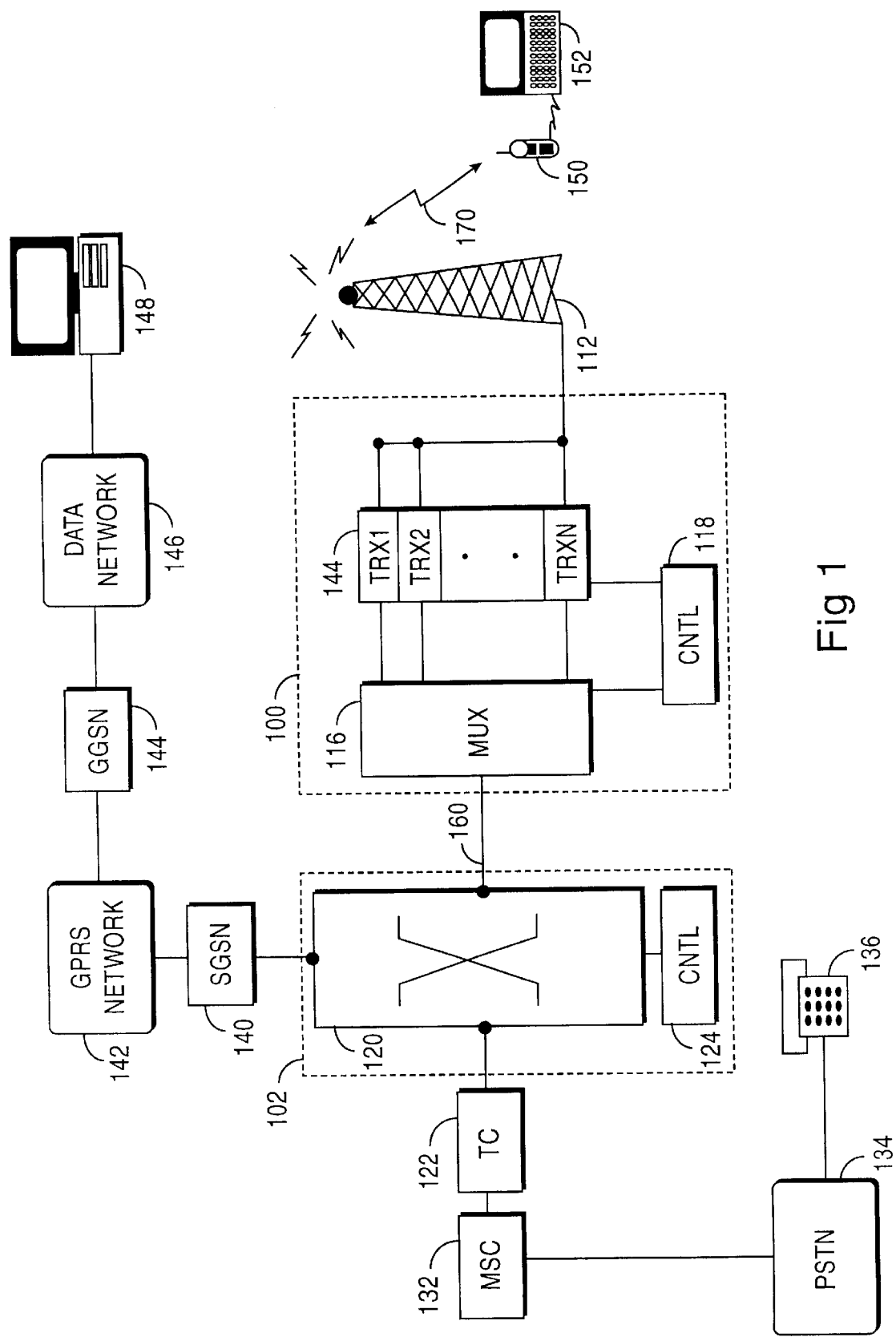
FIG. 1 is a block diagram of a cellular radio network.

With reference to FIG. 1, a typical structure of a cellular radio network according to the invention will be described below together with connections from the network to a public switched telephone network and to a packet switched network. FIG. 1 only contains the elements that are essential for clarifying the invention, but it is evident for those skilled in the art that a conventional cellular radio network also comprises other functions and structures which do not have to be described in greater detail herein.

A cellular radio network comprises a network element 100, 102, 132, 140 and a subscriber terminal 150. The network element 100, 102, 132, 140 comprises, for example, base stations 100, which communicate with the subscriber terminals 150 via a bidirectional radio link 170 where a radio signal is transmitted on a specified carrier frequency. The subscriber terminals 150 can be fixedly positioned, placed in a vehicle or portable hand-held terminal equipments. Several base stations 100 are controlled in a centralized manner by a base station controller 102 communicating with them. The base station 100 comprises transceivers 114, typically from one to sixteen transceivers. One transceiver 114 provides radio capacity for one TDMA frame, i.e. typically eight time slots.

The base station 100 comprises a control unit 118, which controls the operation of the transceivers 114 and a multiplexer 116. The multiplexer 116 places the traffic and control channels used by several transceivers 114 on a single transmission link 160. The transmission link 160 is called an Abis interface. The transmission link 160 is typically implemented by means of a 2 Mbit/s connection or a PCM (Pulse Coded Modulation) link.

The transceivers 114 of the base station 100 are connected to an antenna unit 112, which implements a bidirectional radio link 170 to the subscriber terminal 150. The bidirectional radio link 170 is used for setting up a connection and for packet transfer. Also, the structure of the frames to be transmitted over the bidirectional radio link 170 is defined accurately and it is called a radio interface.

The subscriber terminal 150 can be, for example, a normal GSM cellular phone to which it is possible to connect by means of an extension card for example a portable computer 152, which can be used in packet transfer for ordering and processing packets. Protocol processing can be situated in the subscriber terminal 150 and/or in the computer 152 connected to the subscriber terminal 150.

The base station controller 102 sets up a connection to the subscriber terminal 150 by requesting the base station 100 to transmit a message to the subscriber terminal 150 for the purpose of call set-up. The base station controller 102 comprises a group switching field 120 and a control unit 124. The group switching field 120 is used to switch speech and data and to connect signalling circuits. The base station 100 and the base station controller 102 form a base station subsystem BSS also comprising a transcoder or speech codec or TRAU (Transcoder and Rate Adapter Unit) 122. The transcoder 122 is usually situated as close to a mobile services switching centre 132 as possible, since speech can then be transmitted in cellular network form between the transcoder 122 and the base station controller 102, thus saving transmission capacity.

The transcoder 122 converts the different digital speech coding forms used between the public switched telephone network and the cellular radio network into a compatible form, for example from a fixed network 64 kbit/s form into some other form (e.g. 13 kbit/s) used in the cellular radio network, and vice versa. The control unit 124 performs speech control, mobility management, gathering of statistical data and signalling.

As shown in FIG. 1, the group switching field 120 can set up connections (denoted by black dots) both to a PSTN 134 via the mobile services switching centre 132 and to a packet switched network 142. In the PSTN 134 a typical terminal equipment 136 is a conventional phone or an ISDN (Integrated Services Digital Network) phone.

The connection between the packet switched network 142 and the group switching field 120 is set up by a serving GPRS support node SGSN 140. The function of the SGSN 140 is to transfer packets between the base station system and a gateway GPRS support node GGSN 144 and to keep track of the location of the subscriber terminal 150 within its area.

The GGSN 144 connects a public packet switched network 146 and the packet switched network 142. The interface may employ, for example, the Internet protocol or the X.25 protocol. The GGSN 144 conceals the internal structure of the packet switched network 142 from the public packet switched network 146 through encapsulation, wherefore the packet switched network 142 is viewed by the public packet switched network 146 as a subnetwork, and the public packet switched network 146 can address packets to and receive packets from a subscriber terminal 150 in the subnetwork.

The packet switched network 142 is typically a private network utilizing the Internet protocol and transferring signalling and tunnelled user data. The structure of the network 142 may vary specifically for each operator as regards both its architecture and protocols below the Internet protocol layer.

The public packet switched network 146 can be, for example, a global Internet network. A terminal equipment 148, for example a server computer, which is connected to the public switched network intends to transfer packets to the terminal equipment 150.

The subscriber terminal 150 is connected to a portable computer 152. The data to be transmitted travels from the portable computer 152 to the server computer 148. Data can naturally also be transmitted in the opposite direction, i.e. from the server computer 148 to the portable computer 152. The data travels through the system at the radio interface 170 from the antenna 112 to the transceiver 114 and from there multiplexed in the multiplexer 116 over the transmission link 160 to the group switching field 120, where a connection is set up to an output terminating at the GGSN 140. From the GGSN 140 the data is supplied through the packet switched network 142 via the GGSN 144 to the server computer 148 connected to the public packet switched network 146.

A control channel is a logic radio channel used in radio communication between the base station 100 and the subscriber terminal 150 for call set-up and for signalling required for management of the subscriber terminal 150 and the channel structure. When the subscriber terminals 150 listen to a common control channel (CCCH or PCCCH) in the GPRS system, they use discontinuous reception (DRX) to reduce their power consumption if no radio resources have been allocated to them. The subscriber terminal 150 listens in the DRX mode only to specific, one or more, paging subchannels dedicated to the subscriber terminal. A paging subchannel is a logic radio channel used by the base station 100 for call set-up in radio communication with the subscriber terminal 150. The mobile network knows which subscriber terminal 150 listens to which paging subchannels, wherefore if necessary, it can reach any subscriber terminal 150.

In the GPRS system, each subscriber terminal 150 can decide itself how many paging subchannels it wants to listen to by means of a SPLIT_PG_CYCLE parameter. The subscriber terminal 150 also informs the mobile network 100, 102, 132, 140 of the paging subchannels from which it can be reached.

Due to the DRX function the mobile network 100, 102, 132, 140 cannot transmit to the subscriber terminal 150 a paging request or a channel allocation (access grant) message immediately as the need arises, but the mobile network 100, 102, 132, 140 must wait for a moment when the subscriber terminal 150 is listening to its own paging subchannel.

In the GPRS system, the timing of the control channel messages required by the DRX function can take place in the base station 100, the base station controller 102 or the SGSN 140, depending on the network element where the PCU (Packet Control Unit) functionality is implemented.

The paging subchannel structure of a radio system utilizing packet transfer (GPRS) can be determined either for a packet common control channel PCCCH or for a common control channel CCCH. FIG. 2a shows a simplified example of a logical GPRS paging subchannel structure of the system, which is independent of the physical channel for which the paging subchannel structure is described. In FIG. 2a, symbol G0 refers to paging subchannel 0, G1 refers to paging subchannel 1, etc.

Assume according to FIG. 2b that the SPLIT_PG_CYCLE parameter used by subscriber terminal 1 is such that the terminal listens to paging subchannels G1, G3, G5, G7, etc. Assume also that the SPLIT_PG_CYCLE parameter used by subscriber terminal 2 is such that the terminal listens to paging subchannels G1, G6, G11, etc. At instant t=0 it is detected that channel allocation message A1 should be transmitted to subscriber terminal 1. Since subscriber terminal 1 will next listen to paging subchannel G1 message A1 is to be transmitted on paging subchannel G1.

At instant t=1 it is detected that channel allocation message A2 should be transmitted to subscriber terminal 2. Since subscriber terminal 2 will next listen to paging subchannel G1, message A2 could also be transmitted on paging subchannel G1, but channel allocation message A1 has already been assigned to this subchannel. Since the next closest available paging subchannel to which subscriber terminal 2 listens is channel G6, the channel allocation message could only be transmitted to subscriber terminal 2 on subchannel G6. Such a DRX timing procedure where the service is provided to the one who has first requested it can be considered a conventional method.

In a preferred embodiment of the invention, channel allocation messages to be transmitted according to the DRX principle are preferably arranged such that they can be transferred to the radio path as quickly as possible.

As shown in FIG. 2c, it is detected by means of the method according to the invention that when message A2 is transmitted on paging subchannel G1 and message A1 is transferred to paging subchannel G3, to which subscriber terminal 1 will also listen, the messages can be transmitted to the radio path on average more rapidly than if message A2 were transmitted only on paging subchannel G6.

The method according to the invention thus makes it possible to reduce the average channel access delay of the subscriber terminals 150 and to shorten the time when the radio resources are unnecessarily allocated. Radio resources must be allocated at the same time when a decision is made concerning the transmission of a channel allocation message, and as long as the channel allocation message is being transmitted to the subscriber terminal 150 the radio resources are out of use. If the radio resources are allocated in the base station controller but the timing or scheduling of the control channel takes place in the base station, the GPRS mobile network must make a decision concerning the allocation of the radio resource without being able to synchronize the procedure with the instant when the channel allocation message can be transmitted to the radio path. The method according to the invention thus shortens the duration of time when the allocated radio resources are out of use. However, the method according to the invention does not increase the power consumption of the subscriber terminals 150 within the cell area unlike the Extended Paging procedure, for example, since each subscriber terminal 150 freely selects the paging subchannels it wants to listen to.

In addition to channel allocation messages that must be timed by means of the DRX procedure, the method according to the invention can also be used to advantageously organize and time GPRS paging requests. This also shortens the total channel access delay of the subscriber terminals 150.

Figure 3:
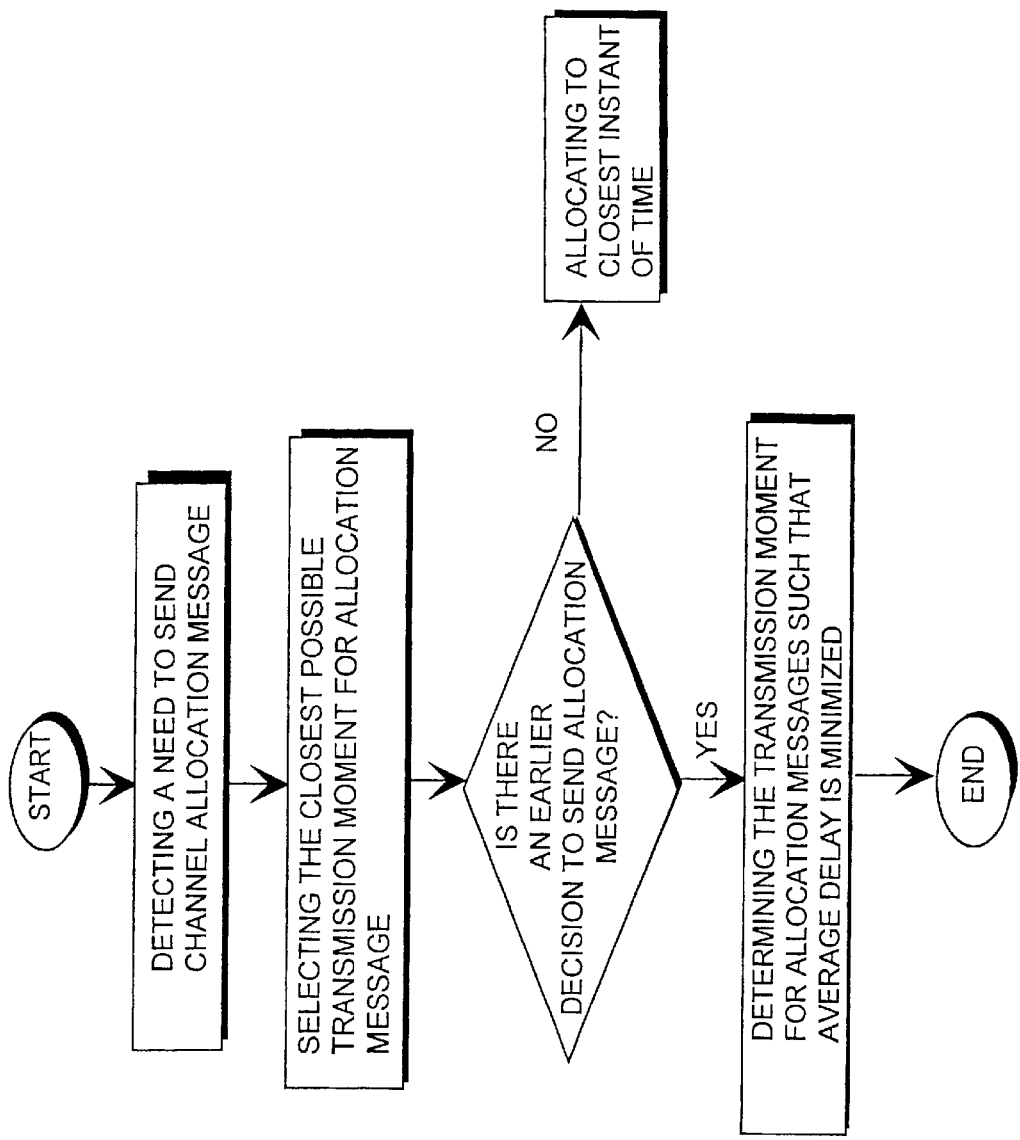
FIG. 3 is a flowchart of a preferred embodiment of the method according to the invention.

FIG. 3 shows the method according to the invention in the form of a flow chart illustrating a preferred embodiment. At a certain instant it is detected that a channel allocation message should be transmitted to the subscriber terminal 150. If no decision to transmit some other channel allocation message has already been made previously at the closest instant when a channel allocation message can be transmitted to the subscriber terminal, the closest possible instant of time is selected as the instant of timing. If some other channel allocation message is already to be transmitted at this closest instant of time, the moments of transmission of both channel allocation messages are retimed such that the average delay of transmitting both channel allocation messages to the radio path is minimized.

Even though the invention is described above with reference to an example according to the accompanying drawings it is clear that the invention is not restricted thereto but it can be modified in several manners within the scope of the inventive idea disclosed in the appended claims.

What is claimed is:

1. A method of reducing radio channel access delay in a packet radio system,
    which system comprises a network element (100, 102, 132, 140) and at least one subscriber terminal (150),
    which, network element (100, 102, 132, 140) transmits channel allocation messages (A1, A2, . . . ) to the subscriber terminals (150),
    which channel allocation messages (A1, A2, . . . ) are transmitted by means of paging subchannels (G0 . . . G9 . . . ),
    and which subscriber terminals (150) listen to one or several paging subchannels (G0 . . . G9 . . . ),
    characterized by organizing the channel allocation messages (A1, A2, . . . ) to be transmitted to the subscriber terminals (150) such that the cumulative total delay of all the channel allocation messages (A1, A2, . . . ) is minimized by optimizing the use of the paging subchannels (G0 . . . G9 . . . ).

2. A method according to claim 1, characterized in that each subscriber terminal (150) only listens to desired paging subchannels (G0 . . . G9 . . . ).

3. A method according to claim 1, characterized in that the network element (100, 102, 132, 140) transmits channel allocation messages (A1, A2, . . . ) to the subscriber terminals (150) according to discontinuous reception (DRX).

4. A method according to claim 1, characterized in that the method is used for advantageously organizing and timing paging messages in a radio system (GPRS, General Packet Radio Service) employing packet transfer.

5. A packet radio system comprising a network element (100, 102, 132, 140) and at least one subscriber terminal (150), wherein the network element (100, 102, 132, 140) is arranged to transmit channel allocation messages (A1, A2, . . . ) to the subscriber terminals (150) by means of a number of paging subchannels (G0 . . . G9 . . . )

and which subscriber terminals (150) are arranged to listen to one or several paging subchannels (G0 . . . G9 . . . ), characterized in that the packet radio system is arranged to organize the channel allocation messages (A1, A2, . . . ) to be transmitted to the subscriber terminals (150) such that the cumulative total delay of all the channel allocation messages (A1, A2, . . . ) is minimized by optimizing the use of the paging subchannels (G0 . . . G9 . . . ).

6. A packet radio system according to claim 5, characterized in that each subscriber terminal (150) is arranged to listen to only desired paging subchannels (G0 . . . G9 . . . ).

7. A packet radio system according to claim 5, characterized in that the network element (100, 102, 132, 140) is arranged to transmit channel allocation messages (A1, A2, . . . ) to the subscriber terminals (150) according to discontinuous reception (DRX).

8. A packet radio system according to claim 5, characterized in that the packet radio system (GPRS, General Packet Radio Service) is arranged to advantageously organize and time paging messages.

\* \* \* \* \*